United States Patent
Fletcher et al.

[15] 3,706,221
[45] Dec. 19, 1972

[54] PARALLEL-PLATE VISCOMETER WITH DOUBLE-DIAPHRAGM SUSPENSION

[72] Inventors: James C. Fletcher, Administrator of the National Aeronautics and Space Administration with respect to an invention of; Thomas H. Sauer, 1132 Atlee Drive, La Canada, Calif. 91011; Robert F. Landel, 1027 Sunmore Lane; Robert F. Fedors, 2127 Pinecrest Drive, both of Altadena, Calif. 91001; Harry T. Fearnehough, 158 West Palm Drive, Arcadia, Calif. 91006

[22] Filed: May 12, 1971

[21] Appl. No.: 142,719

[52] U.S. Cl..........................................73/57, 73/60
[51] Int. Cl..............................................G01n 11/10
[58] Field of Search............73/54, 57, 60, 71.2, 71.4, 73/141 A

[56] References Cited

UNITED STATES PATENTS

| 3,500,677 | 3/1970 | Webb | 73/57 |
| 3,601,732 | 8/1971 | Samuels et al. | 73/141 A X |
| 2,632,062 | 3/1953 | Montgomery | 73/71.4 X |
| 2,767,973 | 10/1956 | Ter Veen et al. | 73/71.2 X |
| 3,308,647 | 3/1967 | Crawford | 73/71.2 X |

*Primary Examiner*—S. Clement Swisher
*Assistant Examiner*—Joseph W. Roskos
*Attorney*—John R. Manning, Monte F. Mott and Wilfred Grifka

[57] ABSTRACT

A parallel-plate viscometer employing an upper optical flat attached to the lower end of a vertical rod axially suspended by a pair of thin, concentrically perforated metal diaphragms and a counter-balance spring system. The upper optical flat is centered and is parallel to a fixed lower optical flat. The upper flat is weighted and lowered until it is just touching a sample placed on the lower flat. The upper flat is then released. The position of the weighted flat as it reduces the height of the sample is recorded, and these recorded values are employed in a mathematical formula to determine absolute viscosity.

10 Claims, 5 Drawing Figures

INVENTORS
THOMAS H. SAUER
ROBERT F. LANDEL
ROBERT F. FEDORS
HARRY T. FEARNEHOUGH

BY Wilfred Grifka

PARALLEL-PLATE VISCOMETER WITH DOUBLE-DIAPHRAGM SUSPENSION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to an instrument for determining absolute viscosity and, more particularly, to an improved parallel-plate viscometer.

2. Description of the Prior Art

Determination of viscosity by available techniques and instruments is cumbersome and does not provide the desired accuracy over a wide range of viscosities, especially at high ($>10^6$ poise) viscosities. The principal method of determining absolute viscosity involves measuring the rate of fall under gravity of a sphere through the fluid being tested. The data is applied to Stoke's Law for determining viscosity of the sample. Capillary tubes are utilized with the Poiseuille equation and other methods have utilized rotating cylinders, oscillating discs or an oscillating cylinder damped by the test fluid in which case suitable calibration corrections must be applied.

Instruments which measure relative viscosity by calibration and comparison to a known standard can be complex, inconvenient and time consuming to set up and operate or do not provide sufficiently accurate data. A simpler and more direct determination has been achieved by use of the parallel-plate method of determining viscosity. The parallel-plate method subjects the test sample to shear stress alone, allowing a theoretical, absolute viscosity computation. Instruments based on the parallel-plate method are relatively inexpensive, and are simple to operate. Moreover, these instruments may be easily and efficiently utilized, to quickly provide a precise indication of the viscosity of minute quantities of test fluids and slurries.

A parallel-plate viscometer described in U.S. Pat. No. 3,500,677, supports the upper plate on the shaft. The shaft is slidingly mounted in a linear ball bearing bushing system. However, significant non-linearities in the ball bearing system have been experienced which have precluded accurate determination of viscosity. Another parallel-plate viscometer has been developed in which the shaft carrying the upper plate is suspended at one end of a counter-balanced beam. This device has achieved fair results except during the measurement of low viscosity samples when vibrations were experienced which significantly affected the readings. It suffers from the defect that the plates cannot be kept parallel during a viscosity determination.

SUMMARY OF THE INVENTION

In accordance with this invention, a suspension system for the upper plate of a parallel-plate viscometer has been developed which permits a relatively frictionless fall of the plate while preventing any significant lateral or tilting movement of the plate or transmission of vibration so that the viscometer is capable of achieving highly accurate measurements over a wide range of viscosities. The viscometer is useful in measuring the viscosity of liquids and viscoelastic materials, such as various oils, greases and slurries, as well as blood. The viscometer of this invention is capable of being utilized as a portable blood-typing instrument.

The parallel-plate viscometer of the present invention includes a lower or stationary plate for supporting the sample to be tested; an upper plate, a pair of thin, flexible metal diaphragms, a stiff rod axially connecting said diaphragms to said upper plate to form an assembly which vertically moves freely downward in a path perpendicular to said lower plate; and means for measuring the movement of said upper plate. The stationary plate may be mounted on a support including micrometer and leveling means for adjusting the height and pitch of the plate relative to said upper plate. Counter-balance spring means may be applied to the upper plate support assembly to bias the upper plate support assembly upwards and a platform for receiving weights may be attached to the upper plate support assembly.

To determine the viscosity of a liquid, a measured weight or volume of sample is placed on the lower plate. The upper plate assembly is then moved downward until the upper plate just touches the sample and the assembly is latched in that position. A weight is positioned on the platform and the upper assembly is then released. As the diaphragms flex under the force of the weight, the upper plate falls and compresses the samples between the plates. A linear displacement transducer senses the position of the plate during compression of the sample and the signal from the transducer is applied to a recording device. The measured and recorded parameters are utilized to compute the absolute viscosity of the sample from a simple formula.

The thin, metal diaphragms provide virtually no resistance to a limited amount of vertical movement but provide enough lateral resistance to keep the plate centered and parallel to the lower plate during vertical movement of the upper plate support assembly. The counter-balance spring system and the diaphragm are securely attached to a rigid frame. The vertical rod is provided with a spring loaded lock which prevents movement when weights are placed upon a platform at the upper end of the rod.

These and many other attendant advantages of the invention will become more readily apparent as the invention becomes better understood by reference to the following detailed description when considered in conjunction with the accompanying drawings.

DESCRIPTION OF THE PREFERRED EMBODIMENTS

Figure 1:
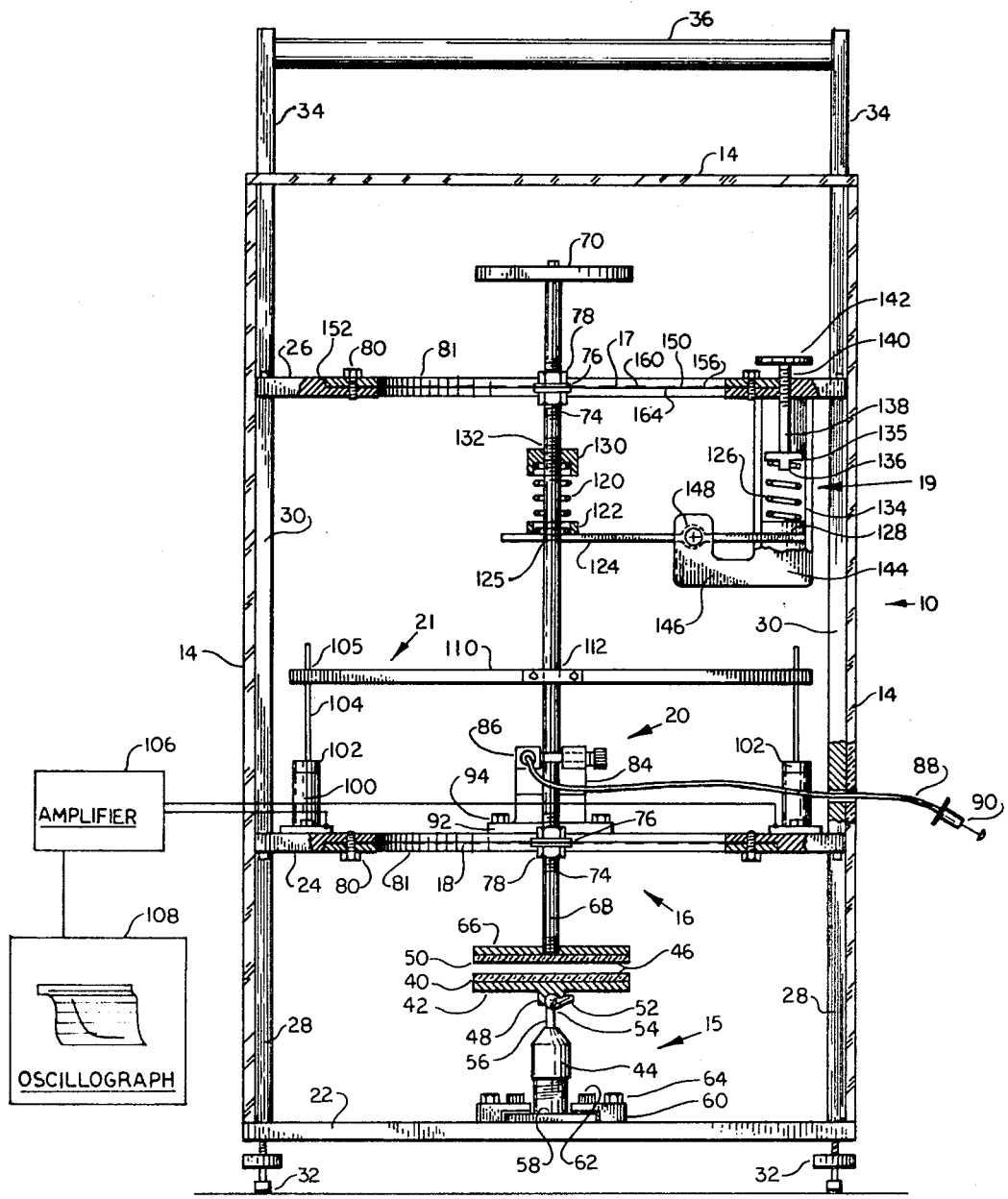
FIG. 1 is a front elevational view, partly in section of a portable parallel-plate viscometer in accordance with the invention.
Figure 2:
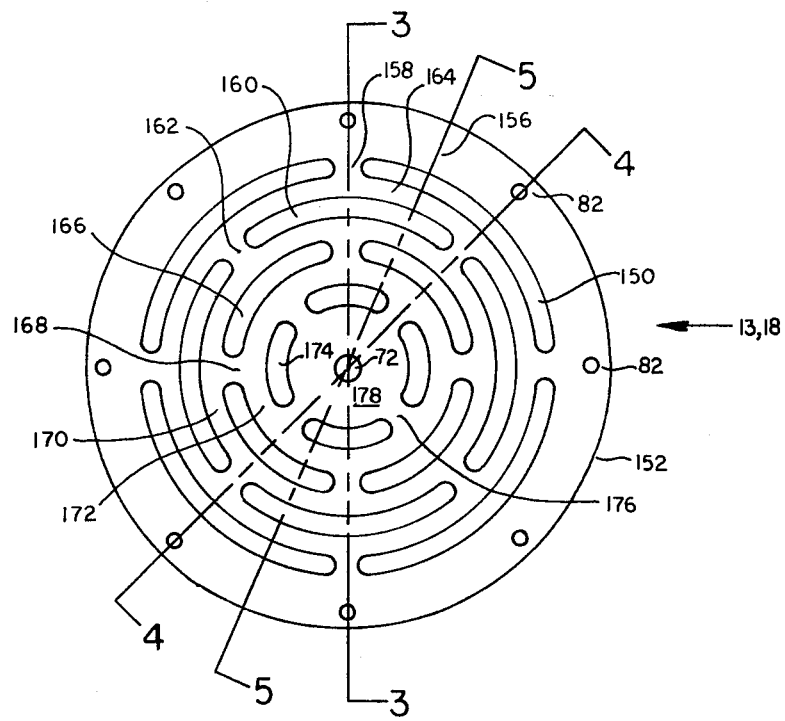
FIG. 2 is a top elevational view of one configuration of a concentrically perforated diaphragm for suspending the upper plate.

Referring now to the drawings, the illustrated embodiment of a parallel plate viscometer 10 of the invention generally includes a rigid metal box frame 13, a lower plate assembly 15, an upper plate assembly 16, a counter-balance spring system 19, a latching mechanism 20 and an upper plate position detection assembly 21.

The frame 13 consists of a rigid base plate 22, an intermediate plate 24 for supporting lower diaphragm 18 and an upper plate 26 for supporting upper diaphragm 17. Four lower corner posts 28 are connected to the base plate 22 and the intermediate plate 24 and four upper corner posts 30 connect the intermediate plate 24 to the upper plate 26. The frame 13 may be enclosed with transparent plastic side panels 14 and with front and rear transparent door panels, hinged thereto, not shown. Leveling screws 32 are provided at each of the four corners of the base plate 22 and handle supports 34 are connected to each side of the upper plate 26. A carrying handle 36 extends between the handle supports 34.

The lower plate assembly 15 includes a lower plate 40 bonded to an aluminum disc 42 which is adjustable in height by means of micrometer sleeve 44. The lower plate 40 and upper plate 50 have very smooth and flat outer surfaces 46. The plates 40, 50 can be formed from smooth, rigid and non-corroding metal such as stainless steel for measuring certain liquids, such as abrasive slurries or can be ordinary glass for many measurements. However, it is preferred that the lower plate 40 and upper plate 50 are discs of high quality, optical grade quartz glass which has mating sides polished to a high degree of flatness. Preferably the mating sides of the discs 40 and 50 are capable of mating accurately to a two color fringe tolerance over 360° of rotation.

The underside of the aluminum disc 42 is provided with a ball and socket joint comprising socket 48, set screw 52 and ball 54. The ball 54 is connected to the micrometer screw 56. The micrometer is provided with a square base 58. The square base 58 is received in a shoe member 60. It is held in place by set screws 62. The shoe 60 is secured to base plate 22 by means of screws 64.

In the upper plate support assembly 16, the upper optical flat 50 is bonded to an aluminum disc 66 which is threadably secured to the lower end of the support rod 68. The support rod 68 also engages the lower diaphragm 18, the latching mechanism 20, the detection assembly 21, the counter-balance spring system 19, the upper diaphragm 17 and the weight platform 70.

The support rod 68 axially extends through central apertures 72 in each of the diaphragms 17 and 18. The rod contains threads 74 at the location for supporting the diaphragms 17 and 18. The diaphragm 17 and 18 are secured to the rod by means of a washer 76 and a nut 78 which engage the diaphragm 17 and 18 on each side of the aperture 72.

Intermediate plate 24 contains a central aperture 81 and a cylindrical downwardly facing bore for receiving the outer edge of the lower diaphragm 18. The lower diaphragm 18 is received in the bore and is secured to the plate by means of a series of equally spaced radially disposed bolts 80. The bolts 80 are received through a series of apertures 82 around the periphery of the diaphragm 18 and into threaded apertures provided through the intermediate plate 24. Upper plate 26 also contains an aperture 81 and a diaphragm 17 is received in a cylindrical bore provided on the upper surface of the upper plate 26 and is secured thereto by means of bolts 80 received through apertures 82 and secured to threaded recesses in the plate 26.

The intermediate plate 24 also supports the lock assembly 20 and the motion detection assembly 21. The lock assembly 20 includes a cylindrical housing 84 supporting a spring loaded latching mechanism 86 coupled to a cable 88 and a trigger 90. The housing 86 surrounds the support rod 68 and has an outer flange 92 secured to threaded apertures in the intermediate plate 24 by means of bolts 94.

The lock assembly 20 holds the shaft 68 in a position along its vertical path within the limits of flexure of the diaphragms 17 and 18 and the spring loaded frictional latching mechanism 86 may be released by means of the trigger 90. Therefore, the upper optical flat 50 may be moved toward or away from the lower optical flat 40 and held in place by the latching mechanism 86 at any position displaced above the lower flat 40. At the desired time, the trigger 90 may be actuated to release the latch 86 and cause the upper plate 50 and support assembly 16 to move downward towards the lower optical flat 40. The latching mechanism disclosed in U.S. Pat. No. 3,500,677, is suitable for use in the viscometer of the invention and the disclosure of the patent is incorporated herein by reference. There are many other latching mechanism's readily available that are useful in the practice of the invention and can be readily substituted by those skilled in the art.

The motion sensing detection assembly 21 includes a pair of linear displacement transducers 100 disposed along each side of support rod 68, 180° apart. The transducers 100 are preferably Linear Variable Differential Transformers (LVDT) which are entirely frictionless devices which convert linear motion into a proportional and completely stepless signal. The transducers 100 include a coil housing 102 rigidly attached to the top surface of intermediate plate 24, 180° apart. A probe 104 extends upwardly from each housing 102. Movement of the probe 104 through the coil housing 102 causes the coil to generate a voltage signal which is amplified in amplifier 106 and the amplified signal is applied to an oscillograph 108 which prints the positional curve of the falling optical flat 50. The upper end of the probes 104 are rigidly attached at 105 to the outer ends of a horizontal bar 110 which is secured at its center point to support rod 68 by means of a sleeve bracket 112.

The weight of the upper plate support assembly 16 comprising the diaphragm 17 and 18 and the support rod 68 can be measured precisely. However, to increase the accuracy and flexibility of measurement, it is preferred to provide a counter-balance spring system 19 which has the capability of balancing or augmenting the weight of the support assembly 16. The counter-balance spring system 19 comprises a first spring 120 surrounding the support rod 68 and having its lower end received in a cup retainer 122 attached to a rocker arm 124. The rocker arm 124 has an axial aperture 125 through which the rod can freely move.

A second coil spring 126 is received in a second cup 128 at the other end of the rocker arm 124. The upper end of spring 120 enters a spring retainer cup 130 threadably fitted to the support rod 68 at 132. The upper portion of the coil spring 126 is received between a pair of downwardly depending brackets 134 which are attached to the bottom surface of the upper plate 26. The upper end of the coil 126 is engaged by a plate member 135 having a downwardly depending lug 136 received within the upper convolution of the spring. The plate member 135 is attached to a rod 138 having a portion 140 threadably received through the upper plate 26. A knob 142 is attached to the upper end of rod 138.

A pair of side arms 144 are attached to the brackets 134 and terminate in an upwardly depending boss 146 which are bored to receive the pivot pin 148 for the rocker arm 124. The upwardly biasing force of the spring system can be adjusted either by rotation of threaded collar cup 130 to adjust the force being applied by spring 120 or by turning knob 142 to adjust the force being applied to the support assembly 16 by spring 126. It is preferred to adjust the tension on spring 126 since the threaded cup 130 is not as conveniently accessible and manipulation of the threaded cup 130 may cause the system to move out of parallel alignment.

The viscometer of the invention does not rely on bearing surfaces to prevent lateral movement of the support rod 68. Rather the support rod 68 is rigidly attached to its axial supports and does not move relative to its supports. The axial supports are in the form of a pair of substantially identical, thin, flexible diaphragms which flex to provide vertical movement. Lateral twisting movements and forces are balanced and eliminated by the parallel spaced disposition of the diaphragm supports. The diaphragm is formed of a thin, highly elastic metal which is thick enough to prevent lateral buckling, but thin enough to flex within the limits necessary for the experiment.

It is further preferred that the diaphragm support operate in flexure rather than in tension when subjected to a normal weight force. Moreover, it is essential for simplicity of operation that the diaphragm have a negligible, or at most, a small, but linear spring constant. A flexure mode of operation can be accomplished by utilizing a convoluted type of diaphragm. However, with convoluted diaphragms, the linear elastic limit in flexure is very small. It is more preferable to perforate the diaphragm with a symmetrical pattern of partial concentric arcuate cut-outs such that the remaining concentric annular arcuate sections and the alternating tangential radial segments interconnecting the sections operate as segments of a balanced leaf spring system.

If the segments of tangency between the alternating diaphragm sectors were disposed in line, the points of tangency would connect to form spokes. Therefore, the spokes would carry the force applied by the weight and would operate in tension, rather than in flexure. The symmetrical pattern of perforations and diaphragm segments prevents lateral movement and tilting of the diaphragm during extension.

Referring now to FIGS. 2 to 5, a particular embodiment of a flexure type of perforated diaphragm support is disclosed. The diaphragm 17, 18 is formed of a circular, thin metal plate having an outer series of apertures 82 for receiving the bolts 80 for connection to the intermediate or upper plates 24, 26. A series of arcuate shaped cut-out sectors, 150, are provided inward from the edge 152 of the diaphragm 17, 18 to provide sufficient length of diaphragm material extending into the central apertures 81 through the diaphragm support plates 24 and 26 to provide an upper leaf spring support portion 156.

In the present embodiment, the arcuate cut-out sectors 150 are each approximately 90° and are provided with a tangential connecting segment 158 between their ends. The next series of arcuate cut-out sectors 160 are rotated 45° with respect to the first sectors 150 such that the tangential connecting segments 162 are rotated 45° with respect to the first tangential connecting portions 158. The diaphragm material between the first and second cut-out sectors 150 and 160 forms a second washer shaped or annular spring member 164.

The third series of four cut-out sectors 166, have the same angular disposition as the first sectors 150 and form tangential connectors 168 between their ends and a third spring member 170 with the adjacent sectors 160. The fourth leaf spring member 172 is formed between the fourth cut-out sectors 174 and the third cut-out sectors 166. Tangential segments 176 are formed between the ends of the sectors 174 and connect the fourth leaf spring member 172 to the inner plate portion 178.

Figure 3:
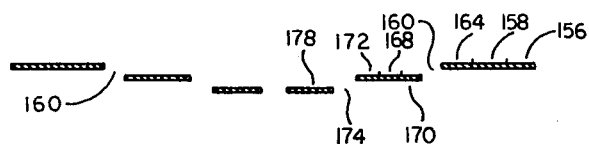
FIG. 3 is a sectional view taken on the line 3—3 of FIG. 2.
Figure 5:
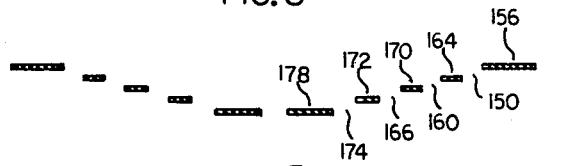
FIG. 5 is a sectional view taken on the line 5—5 of FIG. 2.
Figure 4:
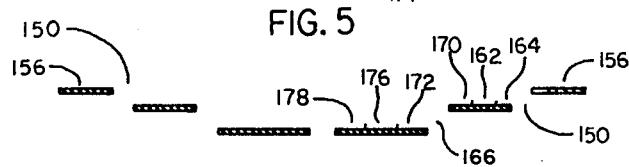
FIG. 4 is a sectional view taken on the line 4—4 of FIG. 2.

Referring further now to FIGS. 3-5, when a weight is applied to platform 70, the diaphragm 17 or 18 will substantially assume the configuration illustrated in FIGS. 3-5. The inner plate portion 178 and upper support portion 156 of each diaphragm 17, 18 will suffer little flexure. The cylindrical leaf members 172, 170, 164 will be highly flexed. However, the tangential connecting segments 158, 162, 168 and 176 will only flex slightly. Typically, up to one-half inch of movement can be accommodated as an essentially free fall movement without suffering lateral movement or tilting of the assembly. In one embodiment of the viscometer that has been constructed, the diaphragm was formed of 0.010 inch beryllium copper alloy, though, it could also be formed of other highly elastic material, such as phosphor bronze spring steel.

To operate the viscometer of the invention, the trigger 90 is actuated to release the latch mechanism 86 to lower the upper optical flat plate 50 onto lower optical flat plate 40. The set screw 52 in ball socket 48 is loosened and the micrometer adjust sleeve 44 is advanced to zero reading. This zeroes the system and allows the lower flat plate 40 to adjust itself parallel to the upper flat plate 50. If necessary, the nuts 78 are adjusted so that diaphragms 17 and 18 are essentially undistorted and parallel to their respective supports plates 24, 26. Set screw 52 is then tightened and micrometer sleeve 44 is backed off until enough space is provided between the optical flats 40, 50 to place a spirit level on the lower flat plate 40. At this time, if the diaphragms 17, 18 sag slightly due to improper adjustment of the counter-balance spring system 19, knob 142 is turned until the diaphragms are flat and parallel to each other and to their support plates. Rod 68 is then locked in placed by means of latch mechanism 86. The lower optical flat 40 is then leveled with the aid of the spirit level and leveling screws 32. This prevents possible run off of low viscosity test samples.

There are two basic ways in which the device can function. In one mode of operation hereinafter called the constant volume mode, the volume of sample, considered to be cylindrical in shape, is kept constant, that is, none of the sample is squeezed out or lost from between the faces of the flats 40 and 50. In the second mode of operation hereinafter called the constant area mode, sufficient sample is used so that the total area of the faces of the flats 40 and 50 is in contact with the sample at the beginning of a test, and remains so throughout the duration of a test.

In operation, the sample to be tested is placed on the upper surface of the lower optical flat 40. In the first mode of operation, the constant volume mode, an accurately measured amount of the sample in the shape of a single drop, but small enough to preclude sample loss from between the faces of the optical flats, is placed in the center of the upper surface of the lower optical flat 40. In the second mode of operation, enough sample is used to cover the entire face of the upper surface of the lower optical flat 40. In this instance, the amount of sample used need not be measured at all since the amount of sample can be calculated from the known surface areas of the faces of the optical flats and from the measured sample thickness.

A selected weight such as a one-hundred gram weight is added to platform 70. Trigger 90 is then activated to release the spring loaded latch mechanism 86. This allows the two diaphragms 17 and 18 and the two springs 120 and 126 to flex under the force of the weight and the upper plate and rod support assembly 16, falls. Diaphragms 17 and 18 provide a limited amount of resistance to vertical movement, but provide enough lateral resistance to keep support rod 68 straight and the optical flat 40 and 50 parallel. Springs 120 and 126, on the other hand, when flexed by the downward travel of support rod 68, reduce the fraction of the applied weight which serves to cause the sample to flow. Hence, it is necessary to measure the load-flex response of the spring system in order to determine the portion of the total weight which acts on the sample.

This is accomplished as follows: reference marks are applied to both the upper flat 50 and the lower flat 40. The tension springs 120 and 126 are adjusted to provide any desired separation of optical flats 40 and 50 by rotation of the threaded collar cup 130 and by rotation of knob 142. Calibrated weights are then added to platform 70 and the separation between the optical flats 40 and 50 measured by means of a traveling microscope. Measurements are continued until the optical flats 40 and 50 come into direct contact. Separation of the faces of the optical flats 40 and 50 at any load is the difference between the distance between the bench marks at the load and the distance between the bench marks when the faces of the optical flats 40 and 50 are in mutual contact. Data are taken in both loading (decreasing separation of optical flats 40 and 50) and unloading (increasing separation of optical flats 40 and 50) which serves to check for hysteresis effects in springs 120 and 126. Results of this calibration show that there is no appreciable hysteresis in the spring system in that the same readings are obtained under conditions of increase loading and under conditions of decrease loading. In addition, the separation of the faces of the optical flats 40 and 50 which is designated as $h$ (measured in centimeters) depends linearly on the magnitude of the weight, which is designated by F, (measured as grams) acting on platform 70. In mathematical terms, the response may be represented as:

$$F = -b(h-h_o)$$

where $b$ is a constant having a value of 195 gm per cm in the present apparatus and $h_o$ is the separation of the optical flats 40 and 50 when no weights are acting on platform 70. This relationship was found to be applicable for any value of $h_o$.

If now an experiment is carried out with a sample between the optical flats 40 and 50 and a constant weight $F$ on the platform 70, the effective weight designated $F_{eff}$ which acts to deform the sample is:

$$F_{eff} = f + bh$$

where $f = F - bh_o$.

Thus, the effective load is determined once the initial separation, with no weights on platform 70 of optical flats 40 and 60, is known. The viscometer can be so set that the initial separation, $h_o$, is invarient. This is most simple accomplished by making $h_o$ equal to the maximum separation which the optical flats 40 and 50 can achieve.

The absolute viscosity $\eta$ is then calculated from the following equations:

Case 1, constant volume test mode:

$$\frac{2\pi ft}{3V^2\eta} = \left\{ \frac{1}{4}\left(\frac{1}{h^4}-\frac{1}{h_o^4}\right) - \frac{b}{3f}\left(\frac{1}{h^3}-\frac{1}{h_o^3}\right) + \frac{b^2}{2f^2}\left(\frac{1}{h^2}-\frac{1}{h_o^2}\right) \right.$$
$$\left. - \frac{b^3}{f^3}\left(\frac{1}{h}-\frac{1}{h_o}\right) + \frac{b^4}{f^4} \ln \frac{\left(\frac{f+bh}{h}\right)}{\left(\frac{f+bh_o}{h_o}\right)} \right\}$$

where:
$f = F - bh_o$
$F$ = weight acting on platform 70
$b$ = spring constant for the spring system
$h_o$ = height of the sample at time zero
$V$ = sample volume
$\eta$ = absolute viscosity
$h$ = height of the sample at time $t$ The value of $h_o$ and of zero time can be chosen arbitrarily. The value of the absolute viscosity, $\eta$, can be obtained from a log-log plot of the right hand side of the equation against time. When the equation is valid, this plot should be linear with unit slope.

Case 2, constant area test mode:

$$\frac{2ft}{3\pi r^4\eta} = \left\{ \frac{1}{2}\left(\frac{1}{h^2}-\frac{1}{h_o^2}\right) - \frac{b}{f}\left(\frac{1}{h}-\frac{1}{h_o}\right) + \frac{b^2}{f^2} \ln \frac{\left(\frac{f+bh}{h}\right)}{\left(\frac{f+bh_o}{h_o}\right)} \right\}$$

where $r$ is the radius of the optical flats 40 and 50, and the remaining symbols have the same meaning as for case 1, above. The value of $h_o$ and of zero time can be chosen arbitrarily. The value of the absolute viscosity $\eta$ can be obtained from a log-log plot of the right hand side of the equation against time. When this equation is applicable, this plot should be linear with unit slope.

When the latch is released, the motion of upper support rod 68 and upper plate 50 is sensed by the two LVDT's 100. The LVDT's 100 send proportionate electrical signals to the amplifier 106 and oscillograph 108. Time and distance of fall are recorded on the oscillograph chart so that the separation of the upper plate 50 and the lower plate 40 can be computed for any instant of fall. The LVDT's can be employed to provide a double printed trace on the strip chart. Any variation between traces will indicate that the LVDT's are out of alignment. This may occur if the sample has a high enough viscosity to cause lateral displacement of the LVDT's. The LVDT's may be connected to separate amplifiers and oscillographs to provide two different scales of measurement for different ranges of time and distance. The time base of the read out recorder is automatically initiated by the release of spring loaded latch mechanism 86.

The invention provides a simplified, efficient technique for measuring viscosity by the parallel-plate method and may be used for providing a quick and accurate determination of absolute viscosity of liquids and visco-elastic materials such as oils, greases and slurries as well as blood. The viscometer of the invention is compact and insensitive to most minor shocks and can be readily carried from place to place as a portable instrument and quickly set up and operated to provide viscosity determinations. The viscometer of the invention is very promising as a portable-blood-typing instrument.

It is to be understood that only preferred embodiments of the invention have been described and that numerous substitutions, alterations and modifications may readily be made without departing from the spirit and scope of the invention as defined in the following claims.

What is claimed is:

1. A parallel plate viscometer comprising in combination:

a first lower plate having an upper flat surface for receiving a sample;

stationary support means for mounting said first plate in a horizontal plane;

a second upper flat plate having a lower flat surface for subjecting the sample to shear stress;

an upper plate support assembly including a plurality of thin, flexible diaphragms, and axial support means connecting said diaphragms to said upper plate;

mounting means fixedly secured to the edges of said diaphragms for mounting said assembly with said surfaces in parallel alignment and with said assembly freely movable downward in a path perpendicular to said lower plate;

said mounting means including a counterbalance spring member for biasing said assembly upwards; and means for measuring the downward movement of said upper plate.

2. A viscometer according to claim 1 in which said plates are optical flats having a disc-like configuration and said surfaces are substantially equal in area.

3. A viscometer according to claim 1 further including releasable means coupled to said assembly for holding said second plate clear of said first plate and for releasing said assembly for movement of the second plate toward the first plate.

4. A viscometer according to claim 3 in which said assembly further includes platform means attached to said axial support means for receiving a weight to apply a selected force to said assembly.

5. A viscometer according to claim 1 in which said stationary support means includes micrometer and leveling means for adjusting the height and pitch of the lower plate relative to the upper plate.

6. A viscometer according to claim 1 in which the measuring means includes at least one linear displacement transducer for sensing the position of the upper plate during downward movement toward the upper plate.

7. A viscometer according to claim 1 in which said mounting means includes a vertical rigid frame, horizontal apertured plates secured to said frame for fixedly receiving the edges of said diaphragms and said axial support means comprises a rigid vertical rod axially connecting the center of said diaphragms to the upper plate.

8. A viscometer according to claim 7 in which each of said diaphragms are formed of a thin, resilient, elastic metal, and each diaphragm is of sufficient thickness to prevent lateral buckling but is thin enough to operate in flexure.

9. A viscometer according to claim 8 in which the diaphragms are provided with a symmetrical pattern of partial concentric arcuate perforations.

10. A viscometer according to claim 9 in which said arcuate perforations are provided in concentric rows alternating with rows of unperforated annular diaphragm sections, the arcuate perforations in each row are connected by radial segments and the segments in adjacent rows are rotated with respect to the segments in the preceding row.

* * * * *